July 18, 1967 R. W. CLANTON ETAL 3,331,112
MACHINE FOR MOLDING CONCRETE BLOCKS
Filed May 10, 1966 3 Sheets-Sheet 3
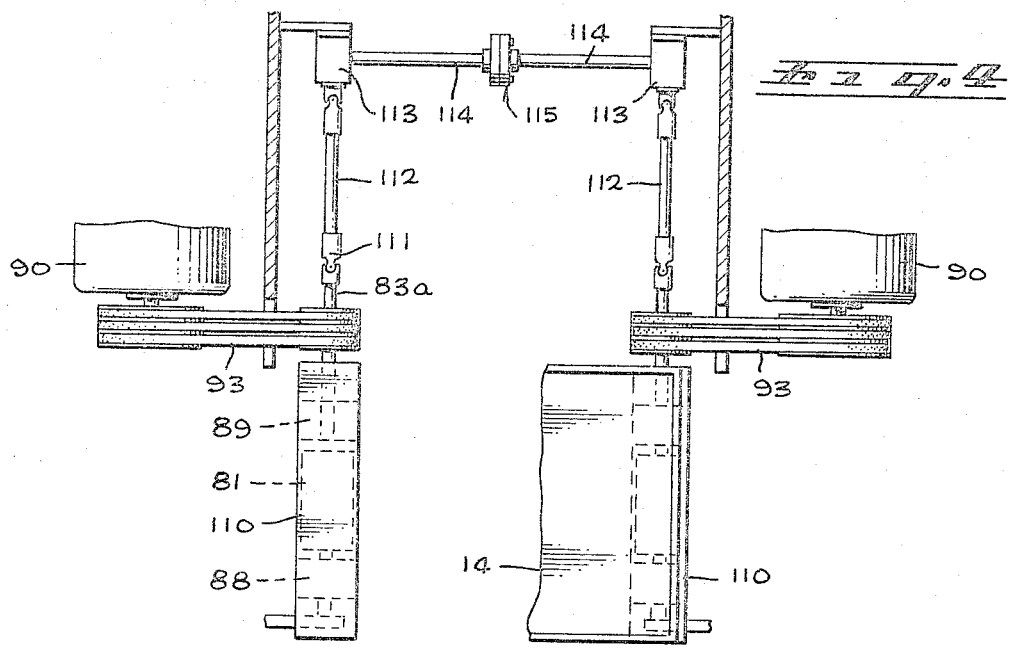
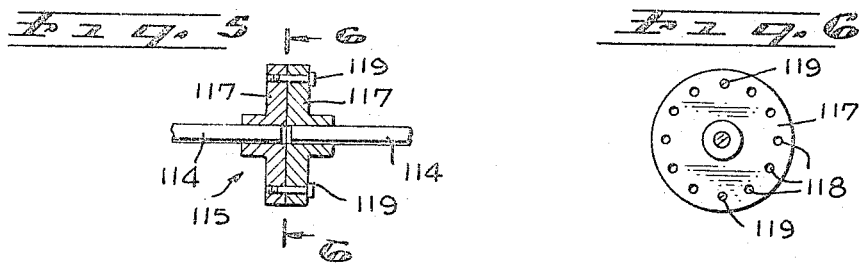
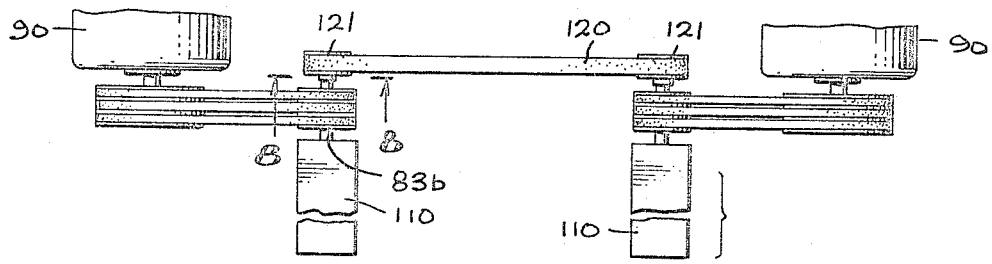
INVENTORS
RAYMOND W. CLANTON
CHARLES W. HOWE
BY
Mason & Graham
ATTORNEYS

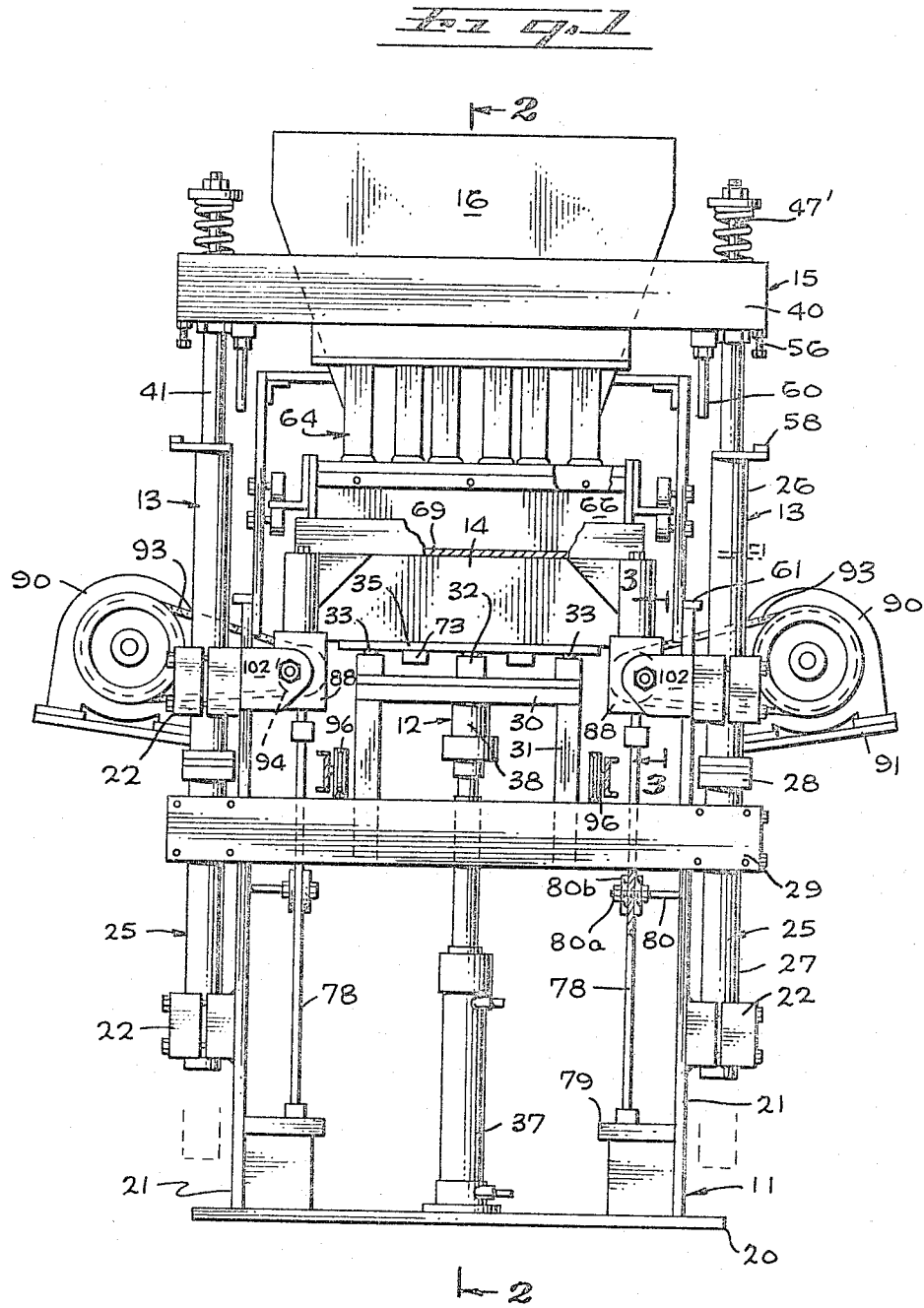

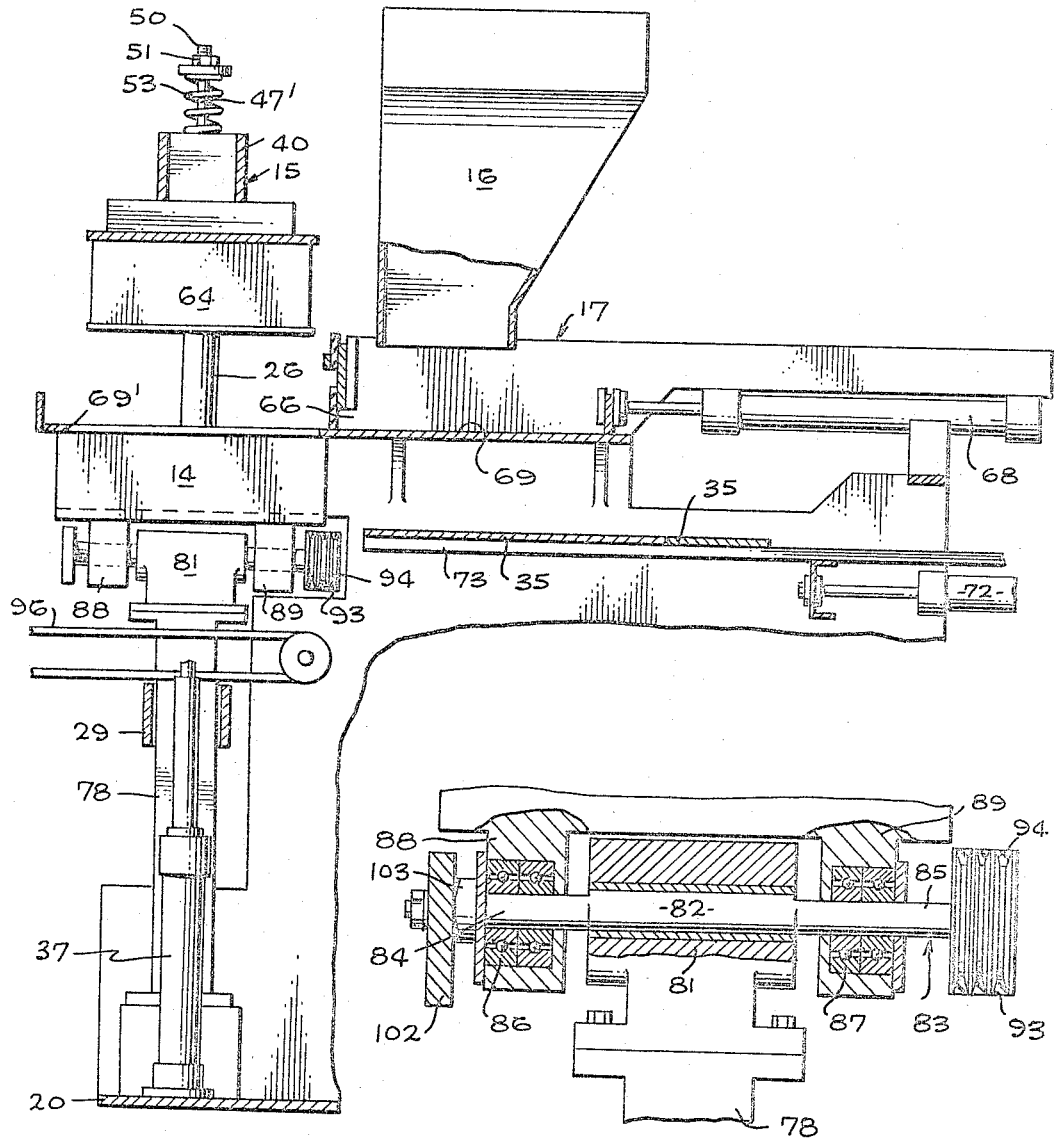

United States Patent Office 3,331,112
Patented July 18, 1967

3,331,112
MACHINE FOR MOLDING CONCRETE BLOCKS
Raymond W. Clanton, 9735 Orcas Ave., Sunland, Calif. 91040, and Charles W. Howe, 27265 Santa Charita Ave., Saugus, Calif. 91350
Filed May 10, 1966, Ser. No. 548,969
8 Claims. (Cl. 25—41)

This invention has to do with apparatus for molding concrete blocks and the like.

The application is a continuation in part of our copending application for patent Ser. No. 354,078, filed Mar. 23, 1964, now Patent No. 3,264,702, issued Aug. 9, 1966.

An object of the invention is to provide a new and improved machine for molding concrete blocks which embodies hydraulic means for operating the principal moving parts, and electromechanical means for supporting and vibrating the mold.

A principal object of the invention is to provide novel means for mounting and vibrating the mold.

Another object is to provide a novel method of vibrating a mold.

These and other objects will be apparent from the drawings and the following description. Referring to the drawings:

FIG. 1 is a front elevational view of a machine embodying the invention;

FIG. 2 is a fragmentary sectional view on line 2—2 of FIG. 1;

FIG. 3 is a fragmentary sectional view on line 3—3 of FIG. 1, but on a larger scale;

FIG. 4 is a fragmentary sectional plan view, with the mold partly broken away, showing a modified form of vibrating apparatus;

FIG. 5 is a sectional view on line 5—5 of FIG. 4, but on a larger scale;

FIG. 6 is a sectional view on line 6—6 of FIG. 5;

FIG. 7 is a view similar to FIG. 4, but showing a modification; and

FIG. 8 is a fragmentary sectional view on line 8—8 of FIG. 7, but on a larger scale.

More particularly describing the invention, in general the machine includes a frame 11, a table assembly 12, a pair of guide tube assemblies 13 mounted on the frame for limited movement vertically and to which the table assembly is fixed, a mold 14, a head beam assembly 15, a hopper 16, and a feed drawer assembly 17.

The frame includes a base plate 20 and vertically disposed laterally spaced side plates 21. Each of the latter is provided with a pair of vertically spaced bearings 22 which slideably support main guide members or tubes 25 of the guide tube assemblies for limited vertical movement. Each guide tube includes a lower section 26 and an upper section 27 with a bolted flanged joint 28 therebetween. The guide tubes and the table assembly are connected together by a table beam 29 which is rigidly attached at its ends to the lower sections 26, respectively, of the guide tubes. Beam 29 carries a table 30 upon upright legs 31, the table including three sets of interrupted rails 32 provided with pads 33 on their upper surfaces. The function of the table is to support a pallet 35 beneath and against the undersurface of the mold 14 during the molding operation, the pallet forming the floor of the mold, and to lower the pallet with the cast or molded blocks thereon at the completion of the molding operation. In FIG. 1 the table assembly 12, guide tubes 25, and the head beam assembly 15 are all shown in raised position.

For the purpose of raising and lowering the table assembly 12, we provide a double-acting upright piston-cylinder unit 37 for operation by pressure fluid which is mounted upon base 20 and which is connected to a suitable coupling 38 carried by the table.

The head beam assembly 15 is carried on a pair of auxiliary guide tubes 41 which are received in guide tubes 25, being raised by a piston-cylinder unit (not shown) in each tube and resiliently lowered by the same unit through a rod 47', all as fully set forth in our above-mentioned copending application. Numerals 56 and 60 designate stops which limit travel of the head beam.

Head beam 40 carries mold stripper or stripping means 64 of suitable configuration which is used for compacting and leveling the concrete mix in the mold and determining the height of the blocks molded therein, and also for expelling the blocks from the mold.

Rearwardly of the mold 14 there is provided a horizontally disposed feed drawer 66 actuated by a fluid-operated piston-cylinder unit 68 which serves to carry the concrete mix forward over a floor 69 from a position beneath the hopper 16 to and over the mold 14 where the floor is apertured at 69'. A supply of pallets 35 is provided at 71 and a suitable fluid-operated piston-cylinder unit 72 is utilized for operating a feed means 73 which acts to feed the pallets one by one beneath the mold where they are supported by the table 30.

A main feature of the invention is the manner and means of mounting and vibrating the mold 14. The latter comprises a box-like member which is open at the top and bottom and provided with a suitable core or cores (not shown) to produce the required shape and size of cavities in the mold. The mold is supported upon a pair of upright springy posts or supports 78 which, preferably, are formed of steel, and are relatively thin in their smallest dimension. These posts are mounted on bases 79 and in each case supported intermediate their ends by a horizontal rod 80 mounted on the frame. Each rod passes through the post and is threaded to receive nuts 80a and resilient washers or pads 80b. At the upper end of each post (FIG. 3) is a bearing 81 which journals a radially enlarged eccentric portion 82 of a shaft 83. End sections 84 and 85 of the shaft are journaled in bearings 86 and 87, respectively, provided in depending portions 88 and 89, respectively, which may be part of the mold or part of a mold support plate to which the mold is bolted. An electric motor 90 mounted on a platform 91 of the frame drives each shaft 83 by means of belts 93 extending around sheaves 94 fixed to the shaft and sheaves (not shown) on the shaft of the motor. The motors 90 may be operated during any portion of the molding operation and normally are operated to vibrate the mold during filling thereof and up to the time the molded blocks are removed from the mold. The two shafts 83 may be operated at the same speed, or at different speeds, if desired. Also the throw of the eccentrics can be varied by substitution of parts.

While the posts 78 are shown as vertically straight in the drawing, we have found it advantageous to bow these slightly, especially in their upper part between the supports 80 and the mold 14, by reason of the fact that, when so bowed, the posts appear to prevent phase synchronization of the two motor-driven eccentric shafts 83. We believe that vibration of the concrete mix is better when the vibrators are not in phase.

The operation of the machine as a whole is set forth in our above-mentioned copending application and need not be described in detail. Briefly, the pallet feed moves the pallet 35 under the mold, and it is then held there as a floor for the mold by the table assembly 12 being raised. The head beam is raised. The feed drawer moves forward to fill the mold and the vibrating means therefor may then be placed in operation. Subsequently the feed drawing retracts, the head beam assembly lowers, and the stripping means 64 slightly enters the mold. After the mix has been compacted the table, guide tube assembly and head beam all move down to eject the blocks. A new pallet is then brought into position and the cycle is repeated.

In FIG. 4 we show a modified form of apparatus wherein it is possible to control and synchronize the vibration means and also to control and adjust the phase relation between the two vibrator assembly shafts at the ends of the molds. Referring to FIGS. 4–6, we show mold supports 110 in which are journaled eccentric shafts 83a carried on posts (not shown), such as the posts 78, as in the previously described form of the invention. However, in this case each shaft 83a is provided with a coupling 111 which connects it to a shaft extension 112. The latter drives a gearbox 113 and, in turn, the output shaft 114 of the gearbox. The two shafts 114 are connected by a suitable coupler 115 and this may be of conventional design comprising at least two members capable of being adjusted rotatively relative to each other and another member or means for locking the two in rotatively adjusted position. In a very simple form it may be merely two circular plates 117 fixed to the respective shafs 114 and provided with a plurality of circumferentially spaced holes 118 to receive bolts 119 for locking the two in adjusted position. For finer adjustements, the holes in one plate may be arcuate.

It will be apparent that, with the construction described, the two mold vibrating shafts 83a will be rotated at the same speed and also that any phase relationship between the two can be achieved as desired for a particular installation and condition by adjustment of the coupler 115.

In FIGS. 7 and 8 we show a vibrator assembly wherein the two shafts 83b of the vibrator assemblies are connected by a belt 120 so that the two may be made to run in synchronism. Preferably this belt is of the toothed type, such as used in timing gears and the like, and runs around sheaves 121 fixed to the shafts and having belt-receiving grooves adapted to mesh with the belt so that there will be no slippage between the belt and the pulleys. If it is desired to adjust or change the phase relation between the two shafts of the vibrator assemblies, this can be done either by adjustably mounting one of the pulleys, or by dismounting the belt, then advancing one shaft relative to the other and remounting the belt.

Although we have illustrated and described preferred forms of our invention, we contemplate that various changes and modifications can be made therein without departing from the invention, the scope of which is indicated by the following claims.

We claim:
1. In a machine for molding concrete blocks or the like having a frame including a base, mold vibrating assembly, comprising a pair of laterally spaced, resiliently flexible upright metal posts having their lower ends mounted on said base, a motor-driven shaft journaled at the upper end of each post, a mold support means carried on said shafts and in which the shafts are journaled, the portion of each shaft journaled in the post being eccentric with respect to the portion journaled in the mold support means, and a mold carried on said support means.

2. The mold vibrating assembly set forth in claim 1 in which said posts are formed of spring steel and are relatively flexible in a direction normal to the axes of said shafts and relatively rigid in a direction parallel to the axes of the shafts.

3. The mold vibrating assembly set forth in claim 1 in which said posts are laterally bowed.

4. The mold vibrating assembly set forth in claim 1 in which said posts are supported intermediate their ends by means carried by the frame.

5. The mold vibrating assembly set forth in claim 4 in which said posts are bowed.

6. The mold vibrating assembly set forth in claim 1 in which the motor drive for each shaft includes a motor mounted on the frame, and a belt drive between the motor and the shaft.

7. Mold vibrating means, comprising a pair of shafts, a support means journaling said shafts, a mold support means journaling said shafts, the portion of each shaft journaled in the support means being eccentric with respect to the portion journaled in said mold support means, separate motor means for driving each of said shafts, and means connecting said shafts to insure synchronization thereof.

8. Mold vibrating means as set forth in claim 7 in which the means connecting said shafts to insure synchronization thereof includes an adjustable coupling for adjusting the phase relationship of the shafts.

References Cited

UNITED STATES PATENTS

| | | | |
|---|---|---|---|
| 1,708,839 | 4/1929 | Jarrett-Knott | 25—41 |
| 1,921,003 | 8/1933 | Romie | 25—41 |
| 2,099,265 | 11/1937 | Freyssinet | 25—41 |
| 2,161,822 | 6/1939 | Kogl | 25—41 |
| 2,231,064 | 2/1941 | Fearn | 25—41 |
| 2,492,415 | 12/1949 | Coates et al. | 25—41 |

WILLIAM J. STEPHENSON, *Primary Examiner.*

R. D. BALDWIN, *Assistant Examiner.*